(12) United States Patent
Blicker

(10) Patent No.: US 7,627,316 B2
(45) Date of Patent: Dec. 1, 2009

(54) METHOD FOR REGISTRATION OF A COMMUNICATION TERMINAL WITH AN IMS SERVICES NETWORK UTILIZING AN SMS MESSAGE SENT TO THE COMMUNICATION TERMINAL

(75) Inventor: Stephan Blicker, Wachtberg-Villip (DE)

(73) Assignee: T-Mobile Deutschland GmbH, Bonn (DE)

( * ) Notice: Subject to any disclaimer, the term of this patent is extended or adjusted under 35 U.S.C. 154(b) by 378 days.

(21) Appl. No.: 11/072,862

(22) Filed: Mar. 4, 2005

(65) Prior Publication Data

US 2005/0202819 A1 Sep. 15, 2005

(30) Foreign Application Priority Data

Mar. 5, 2004 (EP) .................................. 04005227

(51) Int. Cl.
*H04W 4/00* (2006.01)

(52) U.S. Cl. ..................................... 455/435.1; 455/466

(58) Field of Classification Search .............. 455/412.1, 455/435.1, 435.2, 435.3, 466
See application file for complete search history.

(56) References Cited

U.S. PATENT DOCUMENTS

| | | | |
|---|---|---|---|
| 2002/0111167 A1* | 8/2002 | Nguyen et al. | 455/435 |
| 2004/0146040 A1* | 7/2004 | Phan-Anh et al. | 370/349 |
| 2004/0199641 A1* | 10/2004 | Bajko | 709/227 |
| 2005/0114533 A1* | 5/2005 | Hullfish et al. | 709/230 |

* cited by examiner

*Primary Examiner*—George Eng
*Assistant Examiner*—Michael Faragalla
(74) *Attorney, Agent, or Firm*—Cooper & Dunham LLP

(57) ABSTRACT

The present invention relates to a method for the registration of a communication terminal with a IMS services network via at least one communications network. According to the present invention, it is checked on the part of a network element of the IMS services network whether the communication terminal is currently IMS registered. If the communication terminal is not currently IMS registered, an IMS registration procedure is automatically initiated in the communication terminal by transmitting a Short Message SMS to the communication terminal, the Short Message containing an IMS registration request.

On receipt of the SMS the communication terminal automatically registers with the IMS.

10 Claims, 1 Drawing Sheet

METHOD FOR REGISTRATION OF A COMMUNICATION TERMINAL WITH AN IMS SERVICES NETWORK UTILIZING AN SMS MESSAGE SENT TO THE COMMUNICATION TERMINAL

The present invention relates to a method for registration of a communication terminal with an IMS Services Network (IP Multimedia Subsystem Services Network) via at least one communications network.

Subscribers of mobile communication networks of the second and third generation are offered services which require access to special network subsystems, as for example an IP Multimedia Subsystem (IMS). The 3rd Generation Partnership Project (3GPP) has standardized the IP based multimedia subsystem for UMTS Release 5, cf. "3GPP TS24.228 V5.0.0 (2002-03); Technical Specification Group Core Network (Release 5)". The system provides generic functionalities in order to establish sessions via packet switched access networks, e.g. General Packet Radio Service (GPRS).

For mobile networks it cannot be presumed, that all potential IMS subscribers having access to a packet switched network, i.e. having an active PDP context response, are at the same time registered with IMS services. That means that a significant number of subscribers will not be reachable for IMS services because the requested services cannot be terminated to subscribers who are not IMS registered. In order to be able to reach the subscribers who are not IMS registered, a new mechanism has to be developed.

It is the object of the invention to provide a method and system for performing a forced registration of a communication terminal with IMS services.

This object is achieved by providing a registration method and system as described in the independent claims.

Other features which are considered to be characteristic for the invention are set forth in the dependent claims.

According to the present invention, it is checked on the part of a network element of the IMS services network whether the communication terminal is currently IMS registered. If the communication terminal is not currently IMS registered, an IMS registration procedure in the communication terminal is automatically initiated by transmitting a Short Message SMS to the communication terminal, the Short Message containing an IMS registration request.

The method enables the IMS platform to establishing a network initiated IMS registration of a communication terminal, so that the user can participate in instant IMS services.

According to a preferred embodiment of the invention, the network element checks the IMS registration status of the communication terminal on a service request of another communication terminal which is currently IMS registered.

In an additional embodiment, the network element may check the Home Subscriber Server HSS whether the user of the communication terminal has authorized a forced IMS registration procedure.

If the user has authorized forces IMS registration the network element sets up a specific SMS message for IMS registration and transmits it to a Short Message Service Center SMSC which consequently transmits it to the communication terminal to be registered.

In an advantageous embodiment of the invention, in the communication terminal an IMS registration client is started on receipt of the IMS registration SMS, and the communication terminal is automatically registered with the IMS services network.

Also, the network element may send a message to the requesting communication terminal that the requested communication terminal is currently not IMS registered and that it has to wait for registration.

Preferably the network element provides a Call State Control Function CSCF.

The method according to the invention has effect on the IMS core network, in the access network, on the terminal side and on SMS protocol level.

The system for registration of a communication terminal with IMS services comprises: a communications network, an IMS services network connected via a data connection to the communications network, a Call State Control Function CSCF as part of the IMS services network, and a Short Message Service Center SMSC as part of the communications network, wherein the SMSC is connected via a direct data connection to the Call State Control Function.

Preferably the communications network is a mobile communications network comprising a packet switched communications service and a Short Message Service.

The invention will now be described in detail with reference to the drawings.

Figure 1:
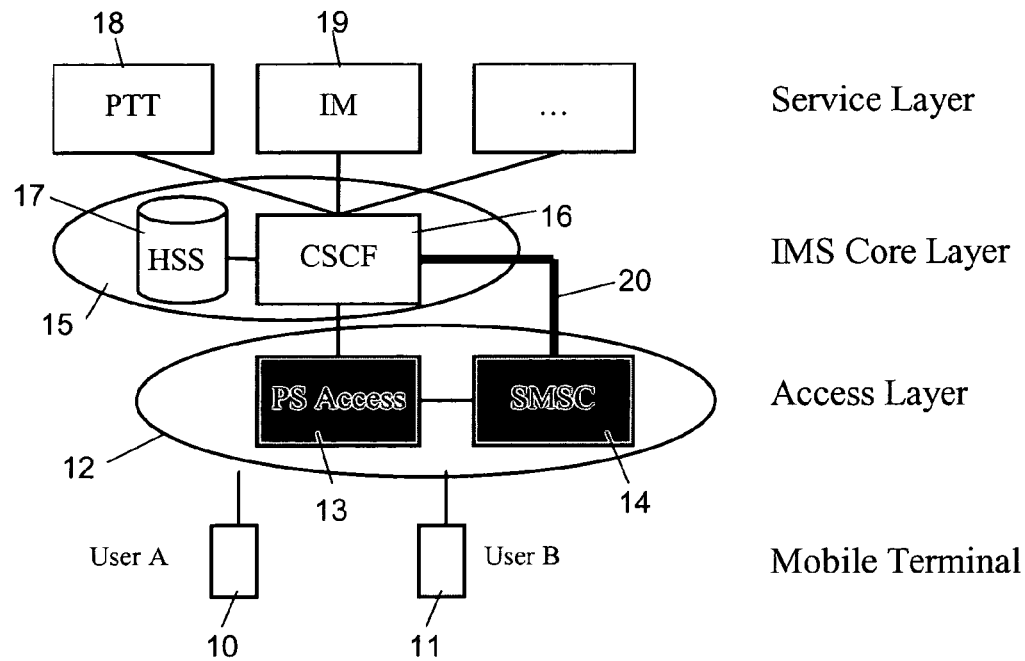
FIG. 1 depicts a target architecture for the IMS registration feature according to the invention.

FIG. 1 depicts a mobile communications network 12, comprising a packet switched access network 13, preferably a GPRS network, which is used for providing access to a IMS services network 15. A first communication terminal 10 and a second communication 11 terminal are connectable with the access network 13 via respective wireless interfaces. The access network 13 comprises a data connection to the IMS network 15. The IMS network 15 comprises a switching network element in form of a Call State Control Function CSCF 16 and a Home Subscriber Server HSS 17 connected thereto. The communication terminals 10, 11 can communicate via the access network 13 with multiple services 18, 19 and service providers of the IMS 16.

User A who wants to use IMS services has to register his/her communication terminal 10 with the GPRS access network 13. The registration with the GPRS access network 13 is carried out by a well known and standardized GPRS user authentication procedure. For using IMS services the communication terminal 10 additionally has to register and authenticate with the IMS network 15. Both registration procedures are automatically performed after the communication terminal 10 is switched on, provided that the user A has subscribed to both GPRS and IMS services.

Further, the invention provides that the access network 13 supports also Short Message Services controlled by a Short Message Service Center 14. The invention also provides that the communication terminals 10, 11, but at least terminal 11, support SMS. According to the invention the CSCF 16 is connected via a direct data interface 20 to the SMSC 14. The CSCF 16 requires direct access to the SMSC 14 in order to provide network initiated IMS registration via Short Message Service.

Figure 2:
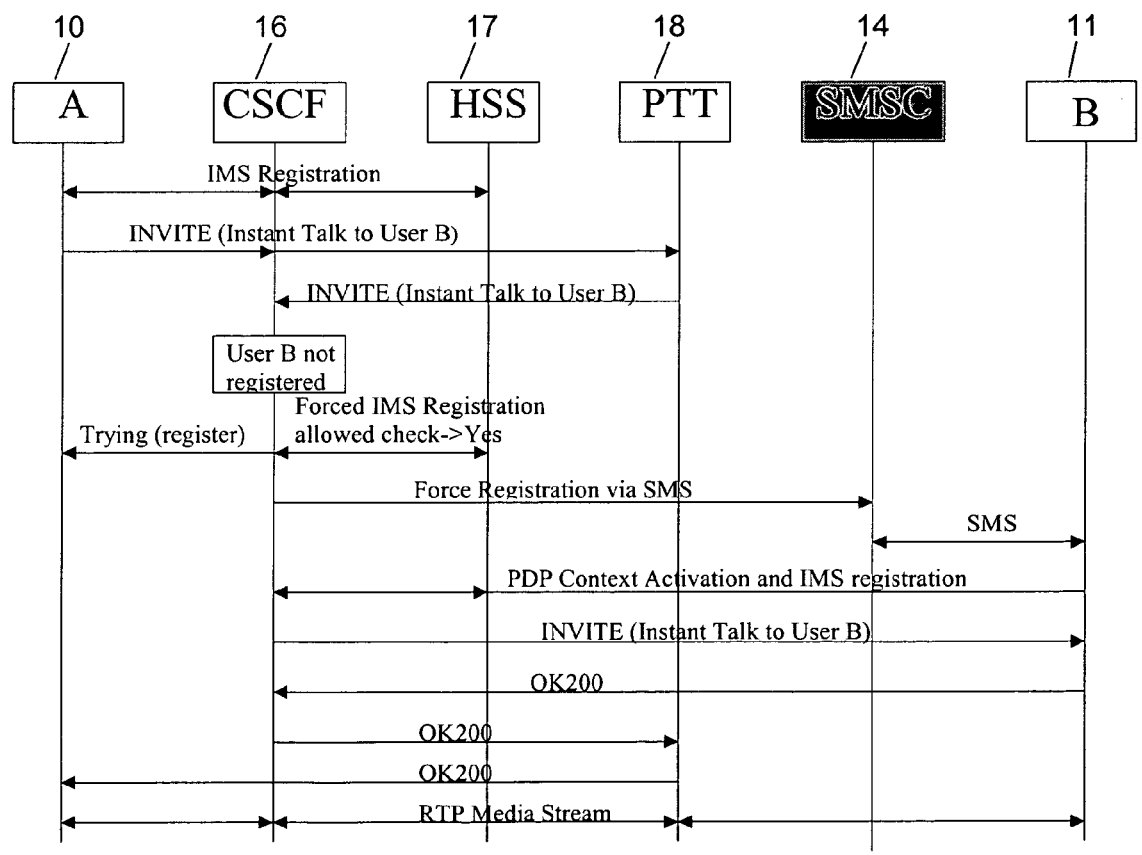
FIG. 2 shows an example for a call flow for during forced IMS registration for a push-to-talk service.

FIG. 2 shows an example of a forced IMS registration procedure according to the invention. IMS offers subscribers among other services a direct-call push-to-talk service PTT 18 over GPRS. Push-to-talk is a cost-efficient, simple to use direct voice service for GPRS-based systems that has attracted the interest of many operators. The technology uses the capabilities of the IP Multimedia Subsystem (IMS) as specified by 3GPP for enabling IP connections between mobile communication terminals.

User A who is operating communication terminal 10 would like to establish a push-to-talk connection with user B who is operating communication terminal 11. It is provided that both communication terminals 10 are already registered with the GPRS access network 13. As described above, user A also registers his/her communication terminal 10 with IMS network 15 and requests (invites) a user B for a push-to-talk session. For this, User A sends his request to the CSCF 16 which forwards it to the PTT service 18. The PTT service 18 transmits an acknowledge message to the CSCF 16. Next, the CSCF 16 checks whether the terminal 11 of user B is currently IMS registered. If the terminal 11 of user B is not yet IMS registered the CSCF 16 checks the HSS database 17 whether user B has allowed the network for automatic IMS registration. The HSS 17 stores a flag which indicates, whether or not user B is allowed to be automatically registered. If user B has enabled an automatic IMS registration, the CSCF 16 informs user A about a pending registration procedure for user B by transmitting a message to terminal 10 of user A, for example the message "Trying to register user B". So user A knows that user B is currently not IMS registered and that he/she has to wait for registration of user B. Next, the CSCF 16 sets up a specific IMS registration message and transmits it via SMS to the SMSC 14. For this, a specification of the SMS text layer for "forced IMS registration" has to be added to the SMS protocol. The SMSC 14 terminates the IMS registration SMS to the terminal 11 of user B. The terminal 11 of user B receives the SMS and recognizes the special SMS text as a request or forced IMS registration. The terminal 11 performs IMS registration and starts the push-to-talk client and PDP context activation. As the terminal of user B is now IMS registered the invitation from user A is received and acknowledged on both sides (OK200) and the push-to-talk service is terminated properly to user B.

LIST OF REFERENCE NUMERALS AND ABBREVIATIONS

10 Communication Terminal
11 Communication Terminal
12 Communications Network
13 Access Network
14 SMSC
15 IMS network
16 CSCF
17 HSS
18 IMS Service (Push-to-Talk)
19 IMS Service
20 Data Interface
IMS IP Multimedia Subsystem
UMTS Universal Mobile Telecommunications Service
GPRS General Packet Radio System
CSCF Call State Control Function
SMSC Short Message Service Center
HSS Home Subscriber Server
PTT Push to Talk
PS Packet Switched

The invention claimed is:

1. Method for registration of a called communication terminal with a IMS services network via at least one communications network, the method comprising:
allowing a user of a communication terminal to pre-select whether the communication terminal is authorized to receive a forced IMS registration procedure;
in response to an IMS service request from a calling terminal, checking whether the called communication terminal is currently IMS registered on the part of a network element of the IMS services network, and if not IMS registered, whether the called communication terminal has been authorized for the forced IMS registration procedure, the calling terminal and the called communication terminal comprising user communication terminals; and
when the called communication terminal is not currently IMS registered, the network element automatically initiating a forced IMS registration procedure in the called communication terminal by transmitting a Short Message SMS to the called communication terminal, the Short Message containing an IMS registration request, wherein in response to the IMS registration request, the called communication terminal is automatically registered without user input.

2. Method according to claim 1, wherein the network element checks a Home Subscriber Server HSS whether the user of the called communication terminal has authorized the forced IMS registration procedure.

3. Method according to claim 1, wherein the network element sets up a specific SMS message for forced IMS registration and transmits it to a Short Message Service Center which transmits it to the called communication terminal to be registered.

4. Method according to claim 1, wherein on receipt of the IMS registration SMS in the called communication terminal an IMS registration client is started, and the called communication terminal is automatically registered with the IMS services network.

5. Method according to claim 1, wherein the network element sends a message to the calling communication terminal that the called communication terminal is currently not IMS registered and that it has to wait for registration.

6. Method according to claim 1, wherein the network element provides a Call State Control Function CSCF.

7. System for registration of a called communication terminal with IMS services comprising:
a communications network;
an IMS services network connected via a data connection to the communications network, the IMS services network checking whether the called communication terminal is currently IMS registered in response to an IMS service request from a calling terminal, and if not IMS registered, whether the called communication terminal has been authorized for a forced TMS registration procedure, the calling terminal and the called communication terminal comprising user communication terminals;
a Call State Control Function CSCF as part of the IMS services network, wherein a user of a communication terminal is allowed to pre-select whether the communication terminal is authorized to receive the forced IMS registration procedure; and
a Short Message Service Center SMSC as part of the communications network, the SMSC is connected via a data connection to the Call State Control Function, wherein if when the called communication terminal is not currently IMS registered, the IMS services network automatically initiating a forced IMS registration procedure in the called communication terminal by causing the SMSC to transmit a Short Message SMS to the called communication terminal, the Short Message containing an IMS registration request, wherein in response to the IMS registration request, the called communication terminal is automatically registered without user input.

8. System according to claim 7, wherein the communications network comprises a mobile communications network.

9. System according to claim 7, wherein the communications network comprises a packet switched communications service.

10. System according to claim 7, wherein the communications network comprises a Short Message service.

* * * * *